United States Patent [19]

Tadokoro et al.

[11] 4,450,199

[45] May 22, 1984

[54] MAGNETIC RECORDING MEDIUM

[75] Inventors: Eiichi Tadokoro; Masaaki Fujiyama; Goro Akashi, all of Kanagawa, Japan

[73] Assignee: Fuji Photo Film Co., Ltd., Kanagawa, Japan

[21] Appl. No.: 251,826

[22] Filed: Apr. 7, 1981

[30] Foreign Application Priority Data

Apr. 7, 1980 [JP] Japan .................................. 55-45408
Apr. 7, 1980 [JP] Japan .................................. 55-45409

[51] Int. Cl.³ ............................ G11B 5/70; B32B 3/10
[52] U.S. Cl. ............................... 428/317.9; 252/62.54; 360/134; 360/135; 360/136; 427/128; 428/423.1; 428/423.7; 428/480; 428/508; 428/522; 428/694; 428/900
[58] Field of Search ....................... 428/692, 694, 423.7, 428/695, 900, 317.9, 480, 423.1, 522, 508; 427/128; 252/62.54; 360/134–136

[56] References Cited

U.S. PATENT DOCUMENTS

| | | | |
|---|---|---|---|
| 3,916,039 | 10/1975 | Akashi et al. | 427/128 |
| 4,032,682 | 6/1977 | Masson | 428/694 |
| 4,163,823 | 8/1979 | Legnas et al. | 428/317.9 |
| 4,201,809 | 5/1980 | Ogawa et al. | 427/128 |
| 4,337,288 | 6/1982 | Takenaka | 428/694 |

*Primary Examiner*—Ellis P. Robinson
*Attorney, Agent, or Firm*—Sughrue, Mion, Zinn, Macpeak, and Seas

[57] ABSTRACT

A magnetic recording medium is disclosed which comprises a nonmagnetic support and a magnetic layer formed thereon, said magnetic layer having a center-line average surface roughness of not more than $2.1 \times 10^{-2} \mu$ and at least one property selected from an average pore size of at least 500 Å and a porosity of at least 30%.

8 Claims, No Drawings

MAGNETIC RECORDING MEDIUM

BACKGROUND OF THE INVENTION

This invention relates to a magnetic recording medium, and more particularly to a "coated type" magnetic recording medium which has a magnetic layer (and optionally a back coating) formed on a nonmagnetic support.

A magnetic recording medium, and particularly video tape, should meet the following four requirements:

(1) good picture quality (i.e., a high signal/noise (S/N) ratio measured by IEC (International Electro-technical Commission) No. 60 60B);

(2) repeated use does not reduce the picture quality (i.e., the reduction of S/N ratio due to repeated tape use should be minimal);

(3) wear of video head by tape is minimal (since video tape must be used repeatedly, the wear of an expensive video head damages the video-tape recorder (VTR)); and (4) the tape has a capability for cleaning the video head (i.e., the image disappears due to a tape flaw or video head gap clogging if foreign matter on the VTR video head remains unremoved. To prevent such a problem the video tape desirably has a good capability for cleaning the head by removing any foreign matter from the head as soon as it is deposited on the head).

Various methods have been proposed to meet requirements (1) to (4), but none of them has been so effective as to completely satisfy all requirements. Therefore, further improvements in magnetic recording materials are desired.

SUMMARY OF THE INVENTION

Therefore, one object of this invention is to provide a magnetic recording medium having a high S/N ratio.

Another object of this invention is to provide a magnetic recording medium wherein the reduction of S/N ratio due to repeated running is minimal.

A further object of this invention is to provide a magnetic recording medium which causes minimal head wear.

Still another object of this invention is to provide a magnetic recording medium having a good capability for cleaning the head.

As a result of extensive studies to achieve these objects, it has been found that while tape having improved surface smoothness provides better S/N ratio, it is less effective in head cleaning, and that such relation can be varied by forming pores in the magnetic layer of the tape or on the surface thereof. Continued studies, focusing on the size of the pores and the porosity in the magnetic layer or on the surface thereof, have now resulted in this invention, which is described hereunder in detail.

The four objects of this invention can be achieved by a magnetic recording medium comprising a nonmagnetic support and a magnetic layer formed thereon having a center-line average surface roughness (Ra) of not more than $2.1 \times 10^{-2} \mu$, and at least one property selected from an average pore size of at least 500 Å, preferably at least 610 Å and a porosity of at least 30%, preferably at least 34%.

A process is also provided for achieving the objects of the invention, i.e., providing a magnetic recording medium as described above, wherein after forming said magnetic layer as described above on said nonmagnetic support, the resulting medium is passed between pressure rolls under condition so as to provide the properties described above.

DETAILED DESCRIPTION OF THE INVENTION

The term "center-line average surface roughness (Ra)" as used herein is defined on page 4 of JIS B0601 (1976), and is represented by the following equation:

$$Ra \text{ (in micrometers)} = \frac{1}{l} \int_0^l |f(x)| \, dx$$

when the roughness curve is represented by $y = f(x)$ wherein the X axis represents the center line of a sample length l chosen from the roughness curve in the direction of its center line and the Y axis represents the direction of vertical magnification.

The term "average pore size (DÅ)" as used herein is represented as $$D = \frac{150,000}{\left(\frac{dV}{dP}\right)_{max}}$$

wherein $(dV/dP)_{max}$ is the maximum differential value on a curve depicted by plotting on the Y axis the sum of the volumes of the pores V (cc) in the magnetic layer minus the volume of pores due to shrinkage of mercury forced into the pores of the magnetic layer and plotting on the X axis the pressure P (kg/cm²) at which mercury was forced into the pores of the magnetic layer.

The porosity is represented by the following formula:

$$\text{Porosity (\%)} = \frac{\text{Volume of pores in the magnetic layer}}{\text{Apparent volume of the magnetic layer*}} \times 100\%$$

(*width × length × thickness of magnetic layer)

The volume of pores in the magnetic layer is measured by the method comprising forcing the mercury into the pores of the magnetic layer under the pressure of 1000 kg/cm² and then measuring the volume of pores forced by mercury.

The center-line average surface roughness, average pore size and porosity can be controlled by varying the composition of the magnetic layer and the conditions for its manufacture, say, the conditions for calendering after application of a coating solution. Such composition of the magnetic layer and the conditions for its manufacture are known to those skilled in the art and can be so controlled as to limit the center-line average surface roughness, average pore size and porosity to be within the ranges defined in this invention.

For the composition of the ingredients incorporated in the magnetic recording medium (e.g. magnetic particles, binder, lubricant, abrasive and antistat) and the method of making such medium, see Japanese Patent Application (OPI) No. 108804/77 (the term "OPI" as used herein means an unexamined published Japanese patent application).

The composition of the ingredients incorporated in the magnetic recording medium is as follows:

(a) In the magnetic tape comprising as an essential component a magnetic powder and binder, the binder contains at least thermosetting resin.

(b) In the magnetic tape of (a), nitrocellulose or vinyl chloride is preferably also contained in the binder.

(c) In the magnetic tape of (a), the binders having an isocyanate group (—NCO) is used as a thermosetting resin.

This invention is now described in greater detail by reference to the following example which is provided for illustrative purposes only and is not intended to limit the scope of the Invention.

EXAMPLE 1

A coating solution of the formulation indicated below was applied to a polyethylene terephthalate film (14.5μ thick) to provide a layer having a dry thickness of 4.8μ, and dried.

| Formulation of coating solution | |
|---|---|
| Co—FeO$_x$ $\left(\frac{4}{3} \leq x \leq \frac{3}{2}\right)$ ; Hc = 660 oersteds; (major axis = 0.4μ, minor axis = 0.04μ) | 300 g |
| Vinyl chloride-vinyl acetate copolymer (molar ratio = 87:13, degree of polymerization = 350) | 28 g |
| Polyester polyol (reaction product of 1 mol of adipic acid, 1 mol of diethylene glycol, and 0.06 mol of trimethylolpropane, viscosity = 1000 cp (35° C.), specific gravity = 1.18, OH value = 60, acid value < 2) | 14 g |
| Soybean lecithin | 3 g |
| Silicone oil (dimethyl polysiloxane) | 0.3 g |
| Alumina oxide | 6 g |
| Polyisocyanate compound (75 wt % ethyl acetate solution of reaction product of 3 mol of 2,4-tolylene diisocyanate and 1 mol of trimethylolpropane) | 2.8 g |
| Methyl ethyl ketone | 400 g |
| Toluene | 1200 g |

Twenty-seven tape samples were prepared as described above, and were calendered under the conditions defined in Table 1 using a 9-roll calendering machine comprising 5 metal rolls and 4 elastic rolls that were arranged so as to apply pressure to the tape samples passing between them. The metal roll, treated to provide a hard chromium plating surface, had an external diameter of 200 mmφ and a surface roughness (Ra) of 150 Å or less. The elastic roll [produced by a mass of fiber (cotton)] had an external diameter of 300 mmφ and surface roughness (Ra) of 500 Å. The calendered magnetic recording media were slit into ½ widths each of which was set in a VHS (Video Home System) video cassette recorder (that is, a ½ small type video recorder), and subjected to the measurement of Y signal to noise ratio (Y-S/N), C signal to noise ratio (C-S/N), cleaning property, head wear and reduction in output upon running the tape past the head. The results of the measurement are shown in Table 1. Tape Sample No. 7 in Table 1 was used as a reference tape for the evaluation of the data in Table 1. The center-line average surface roughness (Ra) of each sample was measured using "Surfcom 3 Type" of Tokyo Seimitsu Co., Ltd. in accordance with JIS Nos. B0601 B0651.

MEASUREMENT OF S/N RATIO

The signals from a signal generator (Sibasoc TG-5) were recorded on each magnetic recording medium, and the signals generated upon reproduction were measured with a noise meter (Shibasoku 925 C). The C-S/N(AM), that is, chroma (color) S/N ratio, was measured in a frequency range of 10 KHz to 500 KHz, and the Y-S/N ratio, that is, the black-and-white (luminous intensity) S/N ratio, was measured in a weighted manner using a filter to decrease the high frequencies. This was measured in a frequency range of 10 KHz to 4 MHz.

MEASUREMENT OF HEAD CLEANING PROPERTY

Signals were recorded on each magnetic recording medium and the output level for Radio Frequency Out (RF OUT) was determined on an oscilloscope. A video tape recorder (VTR) having a clogged head gap (The head gap was clogged by contacting a slight amount of water on the magnetic surface of the tape when started) was operated using the magnetic recording medium, and the time required for the output level for RF OUT to reach 90% of the initial output level was measured.

MEASUREMENT OF HEAD WEAR

The head wear resulting from 500 passes (i.e., a total of 1000 hr of running) of each magnetic recording medium (designed for 2 hr record/reproduce) on a VTR was determined. The testing conditions were 22° C. and 65% RH.

MEASUREMENT OF REDUCTION OF OUTPUT UPON RUNNING

The difference between the output in the first pass of the tape during the measurement of head wear and the output of the 100th pass was measured.

In the overall evaluation in the tables of the specification, "A" means substantially superior in the points of the S/N ratio, head wear, cleaning property, and output reduction; that is, (i) the S/N ratio is more than that of Sample No. 7
(ii) the head wear is 2μ/100 hr or less
(iii) the cleaning is 5 minutes or less, and
(iv) the output reduction is 0.

"B" indicates that one or two of items (i) to (iv) is inferior

"C" indicates that at least three of items (i) to (iv) are inferior

TABLE 1

| Sample No. | Calendering conditions | | | C,L,A, Surface roughness × 10$^{-2}$ (μ) | Av. Pore Size (Å) | Y-S/N$^{(dB)}$/ C-S/N$^{(dB)}$ | Head wear (μ/100 hr) | Cleaning property (min) | Reduction in output upon running (dB) | Overall evaluation |
|---|---|---|---|---|---|---|---|---|---|---|
| | (°C.) Temp. | (Kg/cm$^2$) Press. | (m/min) Speed | | | | | | | |
| 1 | 100 | 350 | 20 | 1.5 | 220 | +3/+2.8 | 1 | >60 | −2 | C |
| 2 | 80 | 330 | " | 1.9 | 280 | +2.1/+1.9 | 1.2 | >60 | −1.8 | C |
| 3 | 80 | 300 | " | 2.4 | 260 | −1/−1.5 | 5 | >60 | −2 | C |
| 4 | 95 | 280 | 40 | 1.5 | 340 | 3/+3.5 | 1.1 | 45 | −1.5 | C |
| 5 | 90 | 240 | " | 1.8 | 380 | +1.8/+2 | 1.2 | 45 | −1.2 | C |
| 6 | 90 | 250 | " | 2.1 | 360 | +1/+1 | 2 | 40 | −1.4 | C |
| 7 | 65 | 200 | " | 2.3 | 390 | 0/0 | 3 | 35 | −1 | C |

TABLE 1-continued

| Sample No. | Calendering conditions (°C.) Temp. | (Kg/cm²) Press. | (m/min) Speed | C,L,A, Surface roughness × 10⁻² (μ) | Av. Pore Size (Å) | Y-S/N$^{(dB)}$/ C-S/N$^{(dB)}$ | Head wear (μ/100 hr) | Cleaning property (min) | Reduction in output upon running (dB) | Overall evaluation |
|---|---|---|---|---|---|---|---|---|---|---|
| 8 | 95 | 190 | " | 1.5 | 410 | +3/+4 | 1.2 | 25 | −0.5 | B |
| 9 | 80 | 170 | " | 1.7 | 430 | +2.0/+2.2 | 1.5 | 20 | −0.5 | B |
| 10 | 75 | 180 | " | 1.9 | 440 | +1.6/+1.9 | 1.5 | 20 | −0.5 | B |
| 11 | 80 | 150 | " | 2.1 | 480 | +1.1/+1.4 | 1.8 | 12 | −0.1 | B |
| 12 | 75 | 140 | " | 2.3 | 480 | 0/−0.5 | 2.5 | 12 | 0 | C |
| 13 | 75 | 130 | " | 2.5 | 490 | −2/−1.5 | 3.5 | 15 | 0 | C |
| 14 | 100 | 200 | 60 | 1.5 | 500 | +4.2/+3.8 | 1 | 6 | 0 | A |
| 15 | 90 | 200 | 60 | 1.7 | 510 | +3.2/+2.0 | 1.2 | 4 | 0 | A |
| 16 | 85 | 200 | " | 1.8 | 520 | +2/+1.5 | 1.2 | 4 | 0 | A |
| 17 | 85 | 180 | " | 2.1 | 650 | +1.5/+1.2 | 1.8 | 2 | 0 | A |
| 18 | 70 | 200 | " | 2.4 | 510 | −0.5/0 | 2.8 | 6 | 0 | B |
| 19 | 60 | 180 | " | 2.5 | 560 | −2/−1.5 | 3.6 | 4 | 0 | C |
| 20 | 90 | 200 | 80 | 1.9 | 610 | +1.8/+1.7 | 0.8 | <1 | 0 | A |
| 21 | 80 | 200 | " | 2.1 | 640 | +1/+0.8 | 1.4 | " | 0 | A |
| 22 | 70 | 210 | " | 2.3 | 680 | 0/−0.2 | 2.6 | " | 0 | B |
| 23 | 60 | 240 | " | 2.5 | 650 | −1.5/−2 | 3.0 | " | 0 | C |
| 24 | 70 | 160 | 60 | 1.9 | 740 | +1.8/1.7 | 0.8 | " | 0 | A |
| 25 | 80 | 100 | " | 2.1 | 840 | +0.8/+0.6 | 1.4 | " | 0 | A |
| 26 | 70 | 90 | " | 2.4 | 700 | −1/−0.5 | 2.6 | " | 0 | B |
| 27 | 60 | 80 | " | 2.5 | 800 | −2/−2.5 | 3.8 | " | 0 | C |

EXAMPLE 2

A coating solution of the formulation indicated below was applied to a polyethylene terephthalate film (12.5μ) to provided layer having a dry thickness of 4.2μ, and dried.

| Formulation of coating solution | |
|---|---|
| Chromium dioxide (CrO₂) (Hc = 680 oersteds; size = 0.5 × 0.03μ) | 300 g |
| Nitrocellulose (N₂ content = 11.2–12.3%, degree of polymerization = 550) | 24 g |
| Vinylchloride/vinylidene chloride copolymer (molar ratio = 7:3, degree of polymerization = 400) | 12 g |
| Epoxy resin (reaction product of bisphenol A and epichlorohydrin, m.w. = 900, epoxy equivalent = 460–520, OH content = 0.29%) | 10 g |
| Silicone oil (dimethyl polysiloxane) | 0.3 g |
| Soybeam lecithin | 1.5 g |
| Alumina oxide (av. grain size = 4μ) | 4 g |
| Carbon black (av. grain size = 0.02μ) | 30 g |
| Polyisocyanate compound (75 wt % ethyl acetate solution of reaction product of 3 mol of 2,4-tolylene diisocyanate and 1 mol of trimethylolpropane) | 14.5 g |
| Butyl acetate | 900 g |

Twenty-seven samples were prepared in the same general manner as described in Example 1, and were calendered under the conditions specified in Table 2 using the same calendering machine as was used in Example 1.

The calendered magnetic recording media were slit to ½ widths each of which was installed in a Betamax video cassette device, and subjected to the measurement of Y signal to noise ratio, C signal to noise ratio, head wear, cleaning property, and running property. The results of the measurement are shown in Table 2. Tape Sample No. 7 in Table 2 was used as a reference tape for the evaluation of the data in Table 2.

TABLE 2

| Sample No. | Calendering conditions (°C.) Temp. | (Kg/cm²) Press. | (m/min) Speed | C,L,A, Surface roughness × 10⁻² (μ) | Av. Pore Size (Å) | Y-S/N$^{(dB)}$/ C-S/N$^{(dB)}$ | Head wear (μ/100 hr) | Cleaning property (min) | Reduction in output upon running (dB) | Overall evaluation |
|---|---|---|---|---|---|---|---|---|---|---|
| 1 | 100 | 250 | 20 | 1.6 | 240 | 0.8/2.0 | 0.5 | >60 | 2.2 | C |
| 2 | 90 | 250 | " | 1.8 | 260 | 1.0/0.6 | 0.5 | >60 | −1.6 | C |
| 3 | 60 | 250 | " | 2.2 | 290 | −0.8/−0.6 | 2.5 | >60 | −1.8 | C |
| 4 | 100 | 180 | " | 1.5 | 350 | 0.9/1.1 | 0.8 | 35 | −1.4 | C |
| 5 | 100 | 250 | 30 | 1.9 | 370 | 0.8/1.0 | 1.0 | 34 | −1.3 | C |
| 6 | 70 | 250 | 30 | 2.1 | 380 | 0.8/0.6 | 1.8 | 34 | −1.0 | C |
| 7 | 60 | 200 | " | 2.3 | 390 | 0/0 | 2.1 | 33 | −1.0 | C |
| 8 | 100 | 250 | 40 | 1.5 | 410 | 2.0/1.9 | 1.1 | 15 | −0.6 | B |
| 9 | 90 | 200 | " | 1.8 | 440 | 1.4/1.6 | 1.5 | 14 | −0.4 | B |
| 10 | 90 | 190 | " | 1.9 | 470 | 1.1/1.2 | 1.8 | 13 | −0.5 | B |
| 11 | 70 | 220 | " | 2.1 | 480 | 1.0/1.0 | 2.0 | 12 | −0.1 | B |
| 12 | 60 | 180 | " | 2.2 | 490 | 0.4/0.6 | 2.4 | 12 | 0 | B |
| 13 | 55 | 300 | " | 2.5 | 490 | −1.5/−1.8 | 3.1 | 11 | 0 | C |
| 14 | 100 | 250 | 50 | 1.5 | 500 | 2.0/1.8 | 0.8 | 8 | 0 | A |
| 15 | 90 | 180 | 50 | 1.8 | 520 | 1.8/1.8 | 0.9 | 8 | 0 | A |
| 16 | 75 | 200 | " | 2.0 | 550 | 1.4/1.8 | 1.6 | 7 | 0 | A |
| 17 | 70 | 180 | " | 2.1 | 620 | 0.8/1.2 | 1.9 | 4 | 0 | A |
| 18 | 60 | 120 | " | 2.3 | 630 | +0.2/0.4 | 2.6 | 3 | 0 | B |
| 19 | 55 | 200 | " | 2.6 | 650 | −1.0/−0.4 | 2.8 | 4 | 0 | C |
| 20 | 90 | 100 | " | 1.8 | 600 | 2.4/2.6 | 0.6 | 2 | 0 | A |
| 21 | 70 | 140 | " | 2.1 | 650 | 1.6/1.8 | 1.2 | <1 | 0 | A |
| 22 | 60 | 80 | " | 2.3 | 680 | 0/−0.2 | 1.9 | " | 0 | B |
| 23 | 55 | 190 | " | 2.6 | 700 | −0.9/−1.4 | 2.8 | " | 0 | C |

TABLE 2-continued

| Sample No. | Calendering conditions (°C.) Temp. | (Kg/cm²) Press. | (m/min) Speed | C,L,A, Surface roughness × 10⁻² (μ) | Av. Pore Size (Å) | Y-S/N$^{(dB)}$/ C-S/N$^{(dB)}$ | Head wear (μ/100 hr) | Cleaning property (min) | Reduction in output upon running (dB) | Overall evaluation |
|---|---|---|---|---|---|---|---|---|---|---|
| 24 | 90 | 80 | " | 1.9 | 740 | 2.4/2.1 | 1.8 | " | 0 | A |
| 25 | 70 | 120 | " | 2.1 | 840 | 1.8/1.4 | 2.0 | " | 0 | A |
| 26 | 60 | 70 | " | 2.3 | 720 | −1/−1.2 | 2.5 | " | 0 | B |
| 27 | 55 | 180 | " | 2.6 | 860 | −2.4/−1.8 | 2.8 | " | 0 | C |

The data in Tables 1 and 2 show that a magnetic layer having a surface roughness (Ra) of not more than $2.1 \times 10^{-2} \mu$ and an average pore size of at least 500 Å achieved an optimum compromise of S/N ratio, cleaning property, head wear and running output.

EXAMPLE 3

A coating solution of the formulation indicated below was applied to a polyethylene terephthalate film (14.5μ thick) to provide a layer having a dry thickness of 5.2μ, and dried.

| Formulation of coating solution | |
|---|---|
| Co—FeO$_x$ $\left(\frac{4}{3} \leq x \leq \frac{3}{2}\right)$ ; Hc = 660 oersteds; (major axis = 0.4μ, minor axis = 0.03μ) | 300 g |
| Vinyl chloride-vinyl acetate copolymer (molar ratio = 87:13, degree of polymerization = 380) | 22 g |
| Polyester polyurethane (reaction product of 2,4-diphenylmethane diisocyanate and polyester having a terminal hydroxyl comprising butanediol and adipic acid, m.w. = Ca. 40,000) | 11 g |
| Carbon black (av. grain size = 0.2μ) | 30 g |
| Silicone oil (dimethyl polysiloxane) | 1.2 g |
| Chromium oxide, i.e., Cr$_2$O$_3$, (av. grain size = 0.5μ) | 5 g |
| Polyisocyanate compound (75 wt % ethyl acetate solution of reaction product of 3 mol of 2,4-tolylene diisocyanate and 1 mol of trimethylolpropane) | 11 g |
| Methyl ethyl ketone | 400 g |
| Butyl acetate | 900 g |

Twenty-five tape samples were prepared as described above, and were calendered under the conditions defined in Table 3 using a 9 roll calendering machine comprising 5 metal rolls and 4 elastic rolls that were arranged so as to apply pressure to one another. The calendered magnetic recording media were slit into ½ widths each of which was set in a VHS video cassette recorder, and subjected to measurement of Y signal to noise ratio (Y-S/N), C signal to noise ratio (C-S/N), cleaning property, head wear and reduction in output during running. The results of the measurement are shown in Table 3. Tape Sample No. 9 in Table 3 was used as a reference tape for the evaluation of the data in Table 3. The center-line average surface roughness (Ra) of each sample was measured using "Surfcom 3 Type" of Tokyo Seimitsu Co., Ltd.

The measurements of S/N ratio, head cleaning property, head wear and reduction of output upon running were carried out by the same procedures as in Example 1.

TABLE 3

| Sample No. | Calendering conditions (°C.) Temp. | (Kg/cm²) Press. | (m/min) Speed | C,L,A, Surface roughness × 10⁻² (μ) | Porosity (%) | Y-S/N$^{(dB)}$/ C-S/N$^{(dB)}$ | Head wear (μ/100 hr) | Cleaning property (min) | Reduction in output upon running (dB) | Overall evaluation |
|---|---|---|---|---|---|---|---|---|---|---|
| 1 | 100 | 300 | 40 | 1.6 | 15 | +2.0/+2.6 | 0.4 | >60 | −2.0 | C |
| 2 | 85 | 250 | " | 1.9 | 20 | +1.6/+1.6 | 1.2 | >60 | −1.4 | C |
| 3 | 75 | 230 | " | 2.1 | 20 | +0.8/0.8 | 1.8 | >60 | −1.0 | C |
| 4 | 65 | 200 | " | 2.3 | 19 | 0/0 | 2.8 | 40 | −0.9 | C |
| 5 | 55 | 180 | " | 2.5 | 20 | −1.5/−1.8 | 3.5 | 30 | −0.8 | C |
| 6 | 95 | 300 | 60 | 1.7 | 28 | +1.8/+2.1 | 0.6 | 15 | −1.8 | C~B |
| 7 | 85 | 240 | " | 1.9 | 29 | +1.6/+1.6 | 1.2 | 14 | −1.1 | B |
| 8 | 75 | 210 | " | 2.1 | 26 | 0.8/0.8 | 1.9 | 13 | −0.6 | B |
| 9 | 65 | 200 | " | 2.3 | 25 | 0/0 | 2.7 | 12 | −0.4 | C |
| 10 | 55 | 150 | " | 2.5 | 28 | −1.7/−1.9 | 3.4 | 10 | −0.4 | C |
| 11 | 90 | 300 | 80 | 1.8 | 30 | 1.7/2.0 | 0.9 | 4 | 0 | A |
| 12 | 80 | 240 | " | 2.0 | 31 | 1.4/1.3 | 1.3 | 3 | 0 | A |
| 13 | 75 | 210 | " | 2.1 | 30 | 1.0/1.0 | 1.8 | 3 | 0 | A |
| 14 | 65 | 150 | 80 | 2.3 | 31 | −0.4/−0.2 | 2.9 | 2 | 0 | B |
| 15 | 55 | 130 | 80 | 2.5 | 30 | −2/−2.5 | 3.6 | 1 | 0 | C |
| 16 | 85 | 280 | 100 | 1.9 | 35 | +1.5/+1.4 | 1.1 | <1 | 0 | A |
| 17 | 80 | 240 | " | 2.0 | 36 | +1.3/+1.3 | 1.6 | <1 | 0 | A |
| 18 | 75 | 200 | " | 2.1 | 34 | +1/+1 | 1.8 | <1 | 0 | A |
| 19 | 65 | 160 | " | 2.3 | 36 | 0/+0.1 | 2.9 | <1 | 0 | B |
| 20 | 55 | 140 | " | 2.5 | 38 | −1.2/−1.3 | 3.4 | <1 | 0 | C |
| 21 | 85 | 350 | 120 | 1.9 | 35 | 2/2 | 1.3 | <1 | 0 | A |
| 22 | 80 | 300 | " | 2.0 | 36 | 2.1/2.2 | 1.6 | <1 | 0 | A |
| 23 | 75 | 250 | " | 2.1 | 40 | 1.2/1.4 | 2.0 | <1 | 0 | A |
| 24 | 70 | 200 | " | 2.2 | 40 | 0.5/0.4 | 2.4 | <1 | 0 | B |
| 25 | 55 | 180 | " | 2.5 | 41 | −1/−1 | 3.8 | <1 | 0 | C |

From the data in Table 3, one can see the following:
(1) Good S/N ratio is achieved by a center-line average surface roughness of $2.1 \times 10^{-2} \mu$ or less;
(2) Both cleaning characteristics and the video output (dB) decrease rapidly upon tape running when the magnetic layer has a porosity of less than 30% and the center-line average surface roughness is more than $2.1 \times 10^{-2}\mu$;

(3) A magnetic layer having low surface smoothness provides good cleaning characteristics, but it achieves low S/N ratio and causes increased head wear; and (4) A magnetic layer having a center-line average surface roughness of $2.1 \times 10^{-2}\mu$ or less achieves a good balance of S/N ratio, head wear, and cleaning effect if it has porosity of more than 30%.

EXAMPLE 4

A coating solution of the formulation indicated below was applied to a polyethylene terephthalate film (14.5μ thick) to provide a layer having a dry thickness of 5.5μ, and dried.

| Formulation of coating solution | |
|---|---|
| Chromium dioxide (CrO₂) (Hc = 720 oersteds; size = 0.4 × 0.02μ) | 300 g |
| Polyester polyurethane (reaction product of 2,4-diphenylmethane diisocyanate and polyester having a terminal hydroxyl comprising butanediol and adipic acid, m.w. = ca. 40,000) | 42 g |
| Synthetic non-drying oil modified alkyd resin (oil length = 25%) | 18 g |
| Silicone oil (dimethyl polysiloxane) | 1.2 g |
| Polyisocyanate compound (75 wt % ethyl acetate solution of reaction product of 3 mol of 2,4-tolylene diisocyanate and 1 mol of trimethylolpropane) | 18 g |
| Butyl acetate | 290 g |
| Methyl ethyl ketone | 840 g |

Twenty-five samples were prepared in the same general manner as described in Example 3, and were calendered under the conditions specified in Table 4 using the same calendering machine as was used in Example 3.

The calendered magnetic recording media were slit to ½ widths each of which was installed in a Betamax video cassette device, and subjected to the measurement of Y signal to noise ratio, C signal to noise ratio, head wear, cleaning property, and running property. The results of the measurement are shown in Table 4. Tape Sample No. 9 in Table 4 was used as a reference tape for the evaluation of the data in Table 4.

TABLE 4

| Sample No. | Calendering conditions (°C.) Temp. | (Kg/cm²) Press. | (m/min) Speed | C,L,A, Surface Roughness × $10^{-2}$ (μ) | Porosity (%) | Y-S/N$^{(dB)}$/ C-S/N$^{(dB)}$ | Head wear (μ/100 hr) | Cleaning property (min) | Reduction in output upon running (dB) | Overall evaluation |
|---|---|---|---|---|---|---|---|---|---|---|
| 1 | 95 | 280 | 35 | 1.7 | 19 | 1.8/2.1 | 0.4 | >60 | −2.5 | C |
| 2 | 80 | 260 | " | 2.0 | 20 | 1.2/1.2 | 1.4 | >60 | −1.8 | C |
| 3 | 75 | 240 | " | 2.1 | 21 | 0.8/0.8 | 1.8 | >60 | −1.2 | C |
| 4 | 65 | 200 | " | 2.3 | 24 | −0.2/−0.2 | 2.8 | 35 | −1.1 | C |
| 5 | 55 | 180 | " | 2.5 | 26 | −1.5/−1.8 | 3.5 | 30 | −0.8 | C |
| 6 | 90 | 280 | 45 | 1.8 | 24 | 1.5/1.9 | 0.8 | 14 | −1.9 | C~B |
| 7 | 85 | 260 | " | 1.9 | 26 | 1.6/1.6 | 1.2 | 13 | −1.0 | B |
| 8 | 75 | 240 | " | 2.1 | 28 | 0.9/0.9 | 1.8 | 10 | −0.4 | B |
| 9 | 65 | 260 | " | 2.3 | 28 | 0/0 | 2.8 | 11 | −0.3 | C |
| 10 | 55 | 200 | " | 2.5 | 28 | −1.8/−2.0 | 3.5 | 10 | −0.2 | C |
| 11 | 90 | 280 | 60 | 1.8 | 30 | 1.6/2.0 | 0.7 | 5 | 0 | A |
| 12 | 85 | 240 | " | 1.9 | 31 | 1.7/1.8 | 1.1 | 3 | 0 | A |
| 13 | 75 | 280 | " | 2.1 | 30 | 1.0/1.1 | 1.6 | 2 | 0 | A |
| 14 | 60 | 220 | 60 | 2.4 | 30 | −0.7/−1.1 | 2.9 | 1 | 0 | B |
| 15 | 55 | 240 | 60 | 2.5 | 31 | −1.6/−1.6 | 3.6 | 1 | 0 | C |
| 16 | 100 | 260 | 80 | 1.6 | 35 | 2.4/2.5 | 0.5 | <1 | 0 | A |
| 17 | 85 | 240 | " | 1.9 | 36 | 1.8/1.9 | 1.1 | <1 | 0 | A |
| 18 | 75 | 260 | " | 2.1 | 34 | 1.1/1.0 | 1.8 | <1 | 0 | A |
| 19 | 65 | 260 | " | 2.3 | 35 | 0/0 | 2.8 | <1 | 0 | B |
| 20 | 55 | 240 | " | 2.5 | 36 | −1.5/−1.8 | 3.6 | <1 | 0 | C |
| 21 | 85 | 220 | 100 | 1.9 | 34 | 1.6/1.6 | 1.1 | <1 | 0 | A |
| 22 | 80 | 200 | " | 2.0 | 36 | 1.2/1.2 | 1.5 | <1 | 0 | A |
| 23 | 75 | 200 | " | 2.1 | 40 | 1.0/1.4 | 1.9 | <1 | 0 | A |
| 24 | 70 | 200 | " | 2.2 | 40 | 0.3/0 | 2.4 | <1 | 0 | B |
| 25 | 55 | 200 | " | 2.5 | 41 | −1.9/−1.9 | 3.6 | <1 | 0 | C |

EXAMPLE 5

Four coating solutions were prepared respectively in the same procedures as in Examples 1, 2, 3 and 4, except that the isocyanate compound was removed from each coating solution. These coating solutions were applied to a polyethylene terephthalate film (14.5μ thick) to provide a layer having a dry thickness of 5.5μ, and dried.

These samples were calendered under the conditions defined in Table 5 using the same calendering machine as was used in Example 1. The calendered magnetic recording media were subjected to the same measurements as in Examples 1, 2, 3 and 4, respectively. The results of the measurement are shown in Table 5. From the results of Table 5, it has been found that even if the surface properties of magnetic layer are otherwise in accordance with this invention, the magnetic recording medium produced without using isocyanate is not suitable for a practical use, i.e., the reduction in output upon running is extremely large.

EXAMPLE 6

Four tape samples were prepared respectively in the same procedure as in Examples 1, 2, 3 and 4 except that the isocyanate compound was removed from each coating solution and the calendering step was not carried out. These samples were subjected to same measurements as in Examples 1, 2, 3 and 4, respectively. The results of the measurement are shown in Table 6. From the results of Table 6, it has been found that the center-line average surface roughness and S/N ratio are extremely inferior. As a result, it is apparent that the calendering step is necessary to obtain a magnetic recording medium having an excellent property.

TABLE 5

| Sample No. | Calendering conditions (°C.) Temp. | Calendering conditions (Kg/cm²) Press. | Calendering conditions (m/min) Speed | C.L.A. Surface Roughness × 10⁻² (μ) | Av. Pore Size (Å) | Porosity (%) | Y-S/N$^{(dB)}$/ C-S/N$^{(dB)}$ | Head wear (μ/100 hr) | Cleaning property (min) | Reduction in output upon running (dB) | Overall evaluation | Remarks |
|---|---|---|---|---|---|---|---|---|---|---|---|---|
| 1 | 80 | 200 | 80 | 2.1 | 600 | 33 | +1.1/+0.9 | 1.2 | 10< | −15 | C | *1 |
| 2 | 90 | 100 | 50 | 1.8 | 580 | 31 | 2.2/1.9 | 0.7 | 5 | −7 | C | *2 |
| 3 | 75 | 200 | 100 | 2.0 | 520 | 33 | +1/+1 | 1.6 | 8 | −4 | C | *3 |
| 4 | 75 | 260 | 80 | 2.1 | 560 | 34 | 1.1/1.0 | 1.8 | 10 | −8 | C | *4 |

Note:
*1: In the tape prepared in Example 1, the isocyanate compound was not used.
*2: In the tape prepared in Example 2, the isocyanate compound was not used.
*3: In the tape prepared in Example 3, the isocyanate compound was not used.
*4: In the tape prepared in Example 4, the isocyanate compound was not used.

TABLE 6

| Sample No. | Calendering conditions (°C.) Temp. | Calendering conditions (Kg/cm²) Press. | Calendering conditions (m/min) Speed | C.L.A. Surface Roughness × 10⁻² (μ) | Av. Pore Size (Å) | Porosity (%) | Y-S/N$^{(dB)}$/ C-S/N$^{(dB)}$ | Head wear (μ/100 hr) | Cleaning property (min) | Reduction in output upon running (dB) | Overall evaluation | Remarks |
|---|---|---|---|---|---|---|---|---|---|---|---|---|
| 1 | — | — | — | 4 | 820 | 41 | −8/−6 | 4< | <1 | extremely large, −10 | C | *1 |
| 2 | — | — | — | 4.3 | 760 | 44 | −9/−7 | " | " | extremely large, −10 | C | *2 |
| 3 | — | — | — | 5 | 680 | 46 | −11/−9 | " | " | extremely large, −10 | C | *3 |
| 4 | — | — | — | 4.6 | 830 | 38 | −10/−8 | " | " | extremely large, −10 | C *4 | |

Note:
*1: In the tape prepared in Example 1, the isocyanate compound was not used.
*2: In the tape prepared in Example 2, the isocyanate compound was not used.
*3: In the tape prepared in Example 3, the isocyanate compound was not used.
*4: In the tape prepared in Example 4, the isocyanate compound was not used.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support and a magnetic layer formed thereon, said magnetic layer comprising a magnetic powder and a binder which comprises a thermosetting resin, said magnetic layer having a center-line average surface roughness of not more than $2.1 \times 10^{-2} \mu$, and at least one property selected from an average particle size of at least 500 Å and a porosity of at least 30%.

2. A magnetic recording medium as in claim 1 wherein the magnetic layer has a center-line average surface roughness of not more than $2.1 \times 10^{-2} \mu$, an average pore size of at least 500 Å, and a porosity of at least 30%.

3. A magnetic recording medium as in claim 1 or 2 wherein the center line average surface roughness is not more than $1.9 \times 10^{-2}$ microns.

4. A magnetic recording medium as in claim 1 or 2 wherein the average pore size of at least 610 Å.

5. A magnetic recording medium as in claim 1 or 2 wherein the porosity is at least 34%.

6. A magnetic recording medium as in claim 1 wherein the binder contains nitrocellulose or vinyl chloride.

7. A magnetic recording medium as in claim 1 wherein the thermosetting resin is a binder having an isocyanate group.

8. A magnetic recording medium as in claim 1, which is calendered.